Nov. 8, 1960     W. F. THOMPSON     2,959,446
AUTOMOBILE CRASH ABSORBING CONSTRUCTION
Filed April 24, 1958

INVENTOR.
WILLIAM F. THOMPSON
BY *J. Ledermann*

ATTORNEY

United States Patent Office

2,959,446
Patented Nov. 8, 1960

2,959,446

AUTOMOBILE CRASH ABSORBING CONSTRUCTION

William Francis Thompson, 166 Elm St., New Canaan, Conn.

Filed Apr. 24, 1958, Ser. No. 730,629

1 Claim. (Cl. 296—65)

This invention relates to automobile construction, and the main object is the provision of certain new and useful improvements whereby the safety of the occupants against injury in the case of a collision or impact are substantially increased.

A more specific object of the invention is the provision of a separate frame on which the passenger seats of the vehicle are mounted, which is slidably supported on the main vehicle frame and which at each end is provided with shock-absorbing elements, whereby upon collision or impact of the vehicle the separate or inner frame is free to continue motion in the direction of travel of the vehicle subject to gradual stoppage through the media of the shock absorbers. Thus instead of the passengers being hurled forward upon a front-end collision at the former speed of the vehicle, they will move forward at a greatly reduced speed with consequent diminution of the shock to the passengers.

Moreover, according to the features of the invention herein presented, the shock to the passengers will also be greatly cushioned and reduced in the event that the vehicle is struck from the rear.

The above as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the details shown or described except insofar as they may be deemed essential to the invention.

Referring briefly to the drawing, Fig. 1 is an exploded perspective view of the two-part frame of an automotive vehicle, embodying the features of the present invention.

Figure 1:
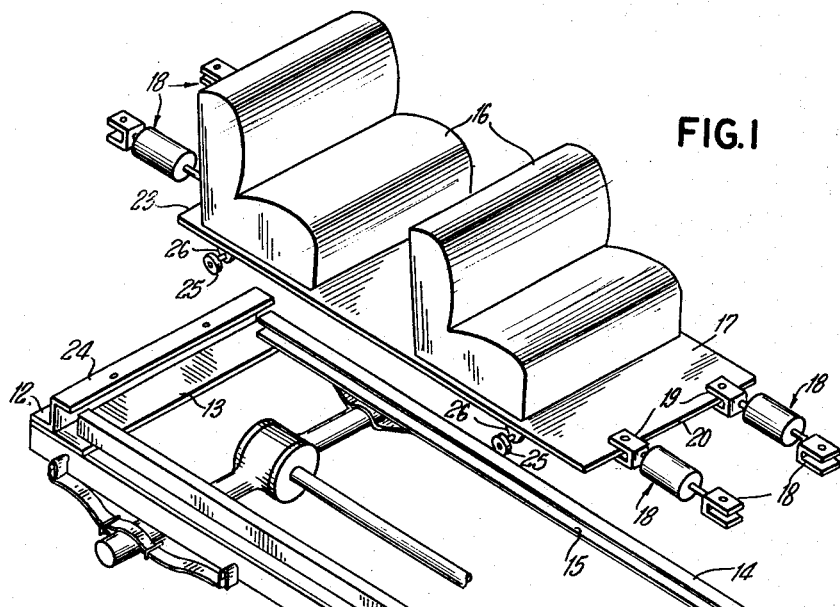
Figure 2:
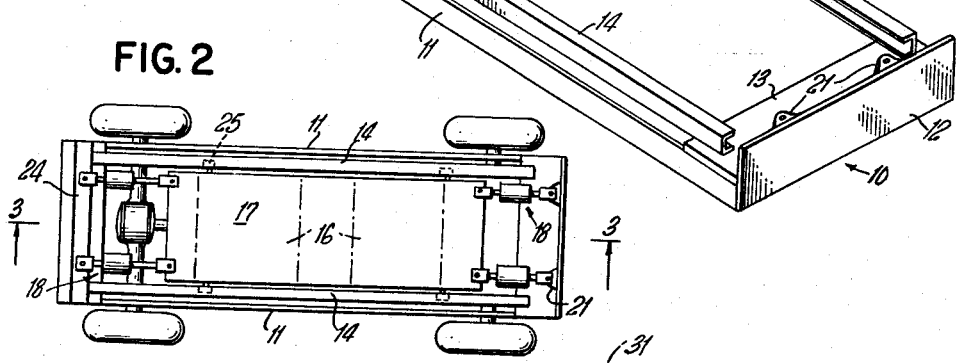
Fig. 2 is a plan view of the two-part frame with the passenger seats omitted but with the outlines thereof shown in phantom.
Figure 3:
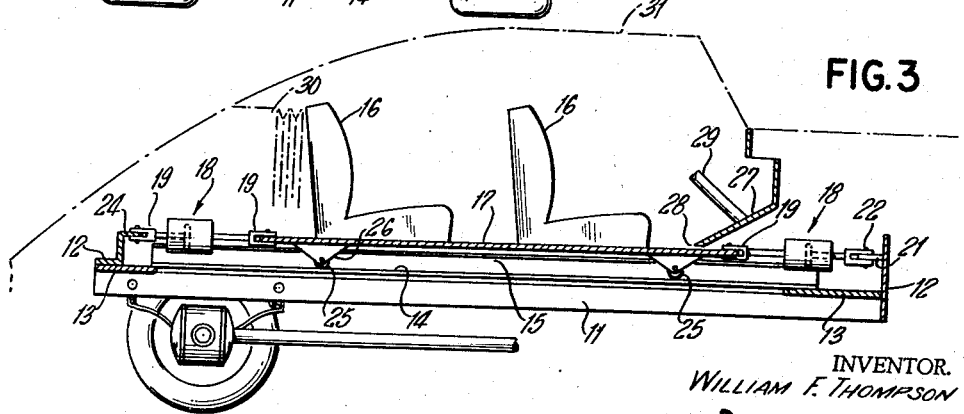
Fig. 3 is a side elevational view of the two-part frame, showing the body of the vehicle fragmentarily in phantom, and including in part a section on the line 3—3 of Fig. 2.

Referring in detail to the drawing, the numeral 10 indicates the usual or standard chassis frame of an automobile. For the sake of simplicity, this frame is shown merely rectangular in form, including the side members 11 and the end members 12. Each end member is provided with an inwardly extending member or web 13, both of which serve as supports for longitudinal rails 14, spaced apart at approximately the spacing of the side frame members 11, although the spacing of the rails is subject to choice. The rails 14 are channel-shaped, that is, in the form of channel irons, with their channels 15 facing inward toward each other.

The vehicle seats 16 are mounted on a panel or board 17. The latter is also, for the sake of simplicity, shown merely flat instead of following the contours of the seat-supporting floor panels of modern vehicles. The panel 17 is made of a sufficiently strong material to serve its purpose, such as steel, and it may be ribbed, not shown, or reinforced with thickened longitudinal members, not shown.

Two laterally spaced shock absorbers of any suitable design but preferably of the hydraulic type, are provided at each end of the panel 17. At each end the shock absorbers have yokes 19. One yoke 19 of each of the two shock absorbers 18 at the front end of the vehicle are secured to the front edge 20 of the panel 17, and the other yokes 19 thereof are secured to extensions or ears 21 of the front end frame member 12; the securement is by bolts 22 or other suitable means. Similarly, the yokes at one end of the rear shock absorbers are secured to the rear edge 23 of the panel 17, and the other yokes thereof are secured to a flange 24 on the rear end frame member 12.

On each side of the panel 17, the longitudinally spaced ears 26 support wheels or rollers 25 which register in the channels 15 of the rails 14 and ride on the lower webs thereof. Thus the panel 17 is free to ride in either direction on the rails 14, subject to the cushioning action of the shock absorbers.

In order that the front edge of the panel 17 may be free to slide forward, the upwardly sloping floor board 27 of the driver's compartment terminates, in a downward direction, above the panel 17, thus leaving a clear space 28 between the panel and the board 27. The steering post is shown at 29, extending through the board 27.

Normally in automobile construction the back wall of the rear seat 16 is integral with the wall 30 of the automobile body 31. Since with the present invention the seat is adapted to move forward or rearward, any suitable space-filler between the back seat wall and the wall 30 may be provided such as, for example, a bellows-like filler shown in phantom at 32, as part of the body 31. The latter is, of course, secured to the main frame 10 of the vehicle in any desired manner, not shown.

From the above it is apparent that upon impact of the vehicle in collision or otherwise, either against the front or the rear of the vehicle or even at a not too large angle with respect to the median line of the vehicle, the shock of the impact upon the occupants is substantially reduced with consequent minimizing of injury to them.

Having thus described the invention, what is claimed and desired to be secured by Letters Patent is as follows:

An automotive passenger vehicle including a main frame substantially rectangular in outline including side members and end members, spaced longitudinal rails supported on said main frame, a substantially rectangular panel having a less length and width than said main frame, said panel having longitudinally spaced passenger seats mounted thereon, longitudinally spaced rigid members extending downward from the longitudinal edges of said panel, wheels supported in said rigid members in vertical planes spaced laterally outward from said edges of the panel, said rails comprising channel members lying on their sides and having the channels thereof facing toward each other, said panel being positioned in a horizontal plane above the plane of said rails and having said wheels registering in said channels and riding on the lower webs of the channel members, and two laterally spaced shock absorbers at each end of said panel having one end thereof secured to the panel and the other end thereof secured to the adjacent end member of the main frame.

References Cited in the file of this patent

UNITED STATES PATENTS

| | | |
|---|---|---|
| 569,094 | Dunlop | Oct. 6, 1896 |
| 1,648,875 | Griese | Nov. 8, 1927 |
| 2,721,616 | Rocha | Oct. 25, 1955 |

FOREIGN PATENTS

| | | |
|---|---|---|
| 799,769 | France | Apr. 11, 1936 |